(12) United States Patent
Hassenpflug et al.

(10) Patent No.: US 8,559,711 B2
(45) Date of Patent: Oct. 15, 2013

(54) METHOD FOR CORRECTING CHROMATIC ABERRATION

(75) Inventors: Frank Hassenpflug, VS-Schwenningen (DE); Wolfgang Endress, Villingen-Schwenningen (DE); Carlos Correa, Villingen-Schwenningen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 852 days.

(21) Appl. No.: 12/381,330

(22) Filed: Mar. 10, 2009

(65) Prior Publication Data
US 2009/0232396 A1  Sep. 17, 2009

(30) Foreign Application Priority Data
Mar. 12, 2008  (EP) .................................... 08300139

(51) Int. Cl.
*G06K 9/00* (2006.01)
*G03F 3/08* (2006.01)

(52) U.S. Cl.
USPC .......................................... 382/167; 358/518

(58) Field of Classification Search
USPC .................................... 382/167; 358/518, 520
See application file for complete search history.

(56) References Cited

U.S. PATENT DOCUMENTS

| | | | |
|---|---|---|---|
| 5,453,840 A * | 9/1995 | Parker et al. | 356/400 |
| 6,363,220 B1 | 3/2002 | Ide | |
| 2001/0030697 A1 * | 10/2001 | Dischert et al. | 348/263 |
| 2003/0086589 A1 | 5/2003 | Hayashi | |
| 2004/0240726 A1 * | 12/2004 | Stavely et al. | 382/162 |
| 2008/0007630 A1 * | 1/2008 | Hara | 348/223.1 |

FOREIGN PATENT DOCUMENTS

| | | |
|---|---|---|
| EP | 1 378 790 A | 1/2004 |
| EP | 1 885 135 A | 2/2008 |
| EP | 1 455 223 A | 9/2008 |
| JP | 2006 317595 A | 11/2006 |

OTHER PUBLICATIONS

European Search Report dated Aug. 19, 2008.

* cited by examiner

*Primary Examiner* — Yubin Hung
(74) *Attorney, Agent, or Firm* — Myers Wolin, LLC

(57) ABSTRACT

The invention relates to a method for correcting chromatic aberration in an image capture device like a camera. It comprises the steps of determining, in the image, an analyzing area around the current pixel, comparing, for the current pixel, a first color component data of a first block of pixels comprising the current pixel to a second color component data of pixels of second blocks of pixels having the same size as the first block within the analyzing area, selecting the second block of pixels having the highest correlation with the first block of pixels, determining the shift vector to be applied to the selected second block in order that said selected second block coincides spatially with said first block of pixels, and shifting the second color component data of the pixel of the selected second block corresponding to the current pixel in accordance with the shift vector so as to correct chromatic aberration.

3 Claims, 4 Drawing Sheets

METHOD FOR CORRECTING CHROMATIC ABERRATION

This application claims the benefit, under 35 U.S.C. §119 of European Patent Application EP 08300139.6, filed Mar. 12, 2008.

The invention relates to a method for correcting chromatic aberration in images generated for example by an image pick-up device like a camera.

BACKGROUND OF THE INVENTION

Camera lenses are never perfect. Some artefacts can happen in the images while capturing a scene. One of these artefacts is known as chromatic aberration. Chromatic aberration is the phenomenon of different colors focusing at different distances from a lens as illustrated by FIG. 1. It produces soft overall images, and color fringing at high-contrast edges, like an edge between black and white. The strength of this aberration varies with different lens attitude.

This distortion is corrected by very complex lens designs called apochromatic lenses (APO). But these designs are very expensive and occur to other problems like loss of exposure or bad Modulation Transfer Function (MTF). There are also some software solutions on the market. But they only do a "postproduction" correction on a computer. Moreover they only work with still images and to find out a satisfying correction, a lot of try and error tests are necessary. This is very time-consuming.

SUMMARY OF THE INVENTION

To solve this problem, it is proposed to do the correction with an appropriate correction algorithm on the fly within the camera.

The invention concerns a method for correcting chromatic aberration between first and second color component data of a current pixel of an image. The method comprises the steps of:
  determining, in the image, an analyzing area around the current pixel,
  comparing, for the current pixel, the first color component data of a first block of pixels comprising the current pixel to the second color component data of pixels of second blocks of pixels having the same size than the first block within the analyzing area,
  selecting the second block of pixels having the highest correlation with the first block of pixels,
  determining the shift vector to be applied to the selected second block in order that the selected second block coincides spatially with the first block of pixels, and
  shifting the second color component data of the pixel of the selected second block of pixels corresponding to the current pixel in accordance with the shift vector.

Thus, spatial shift vectors are determined for pixels of each image captured by the image capturing device and are not predetermined.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

The method is used for correcting the chromatic aberration within images comprising at least two color components (or color channels). The invention is used for correcting chromatic aberration between these two color components. In the following description, the invention is described to correct the chromatic aberration between a red component and a green component. Indeed, the invention can be used for correcting the chromatic aberration between other color components.

Figure 2:
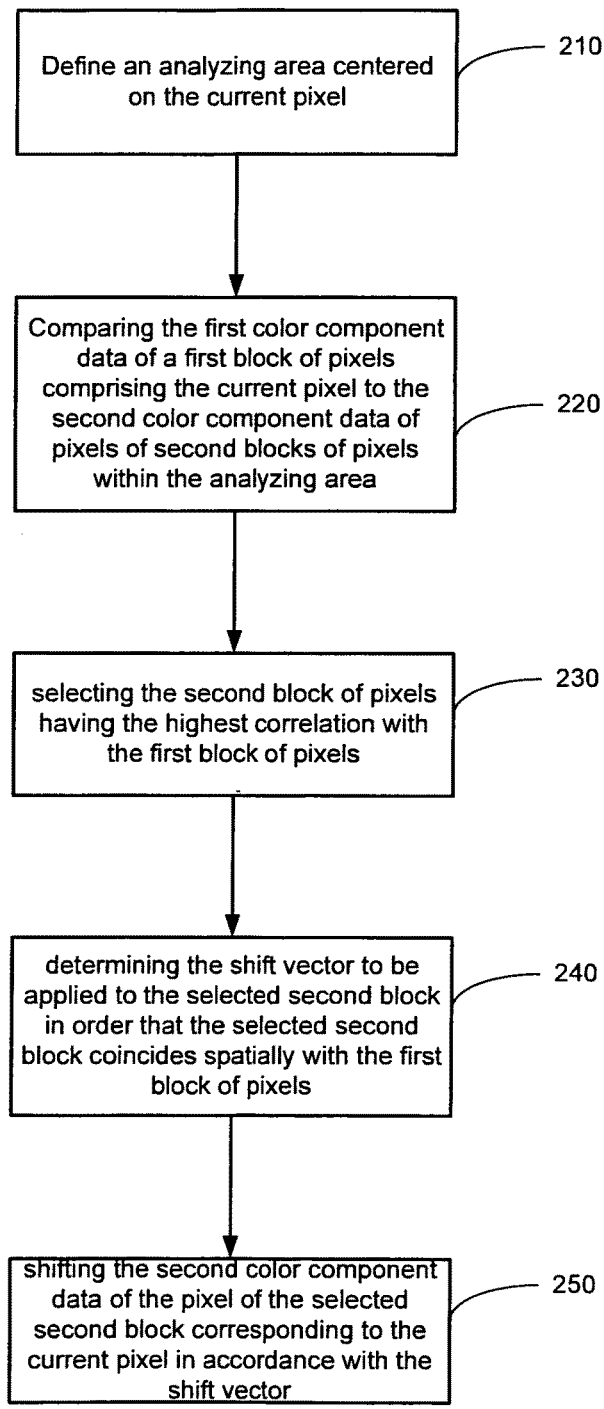
FIG. 2 shows the steps of the method according to the invention.

In reference to FIG. 2, for a current pixel, the method according to the invention comprises the steps of:
  a step 210 for defining, in the captured image, an analyzing area around the current pixel,
  a step 220 for comparing, for the current pixel, the first color component data of a first block of pixels comprising the current pixel to the second color component data of pixels of second blocks of pixels having the same size than the first block within the analyzing area,
  a step 230 for selecting the second block of pixels having the highest correlation with the first block of pixels,
  a step 240 for determining the shift vector to be applied to the selected second block in order that the selected second block coincides spatially with the first block of pixels, and
  a step 250 for shifting the second color component data of the pixel of the selected second block corresponding to the current pixel in accordance with the shift vector.

Figure 1:
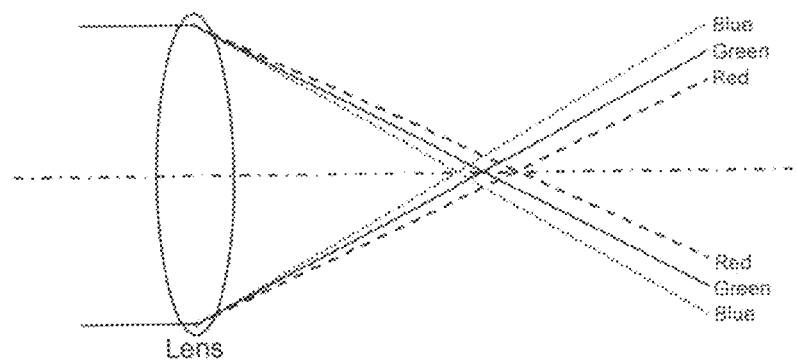
FIG. 1 shows the phenomenon of chromatic aberration.
Figure 3:
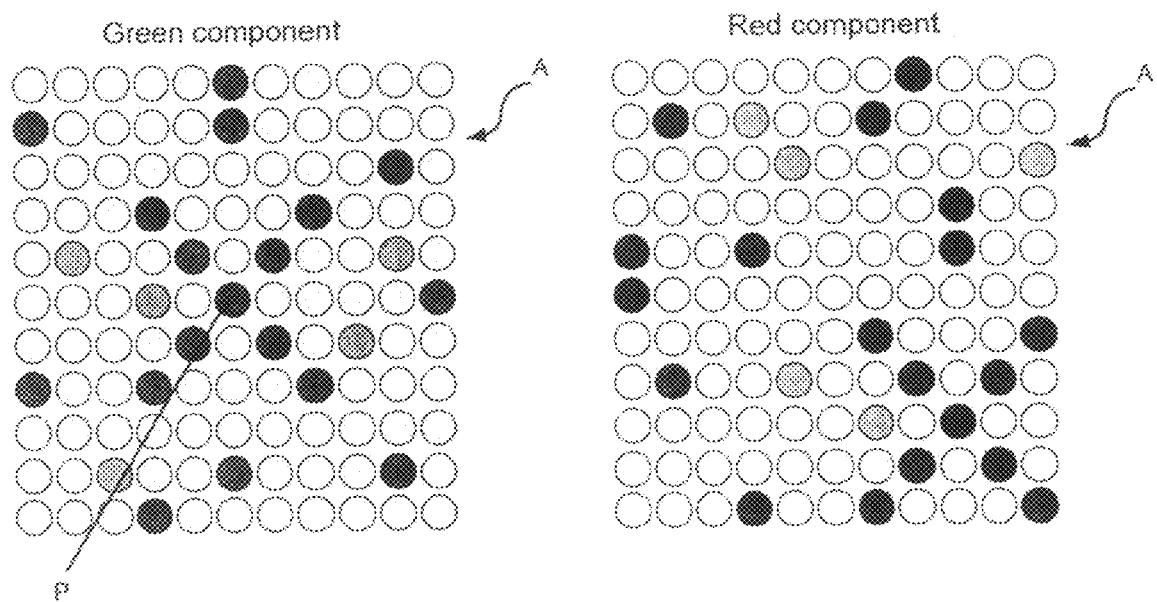
FIG. 3 to FIG. 5 illustrate by an example the steps as defined in FIG. 2.
Figure 4:
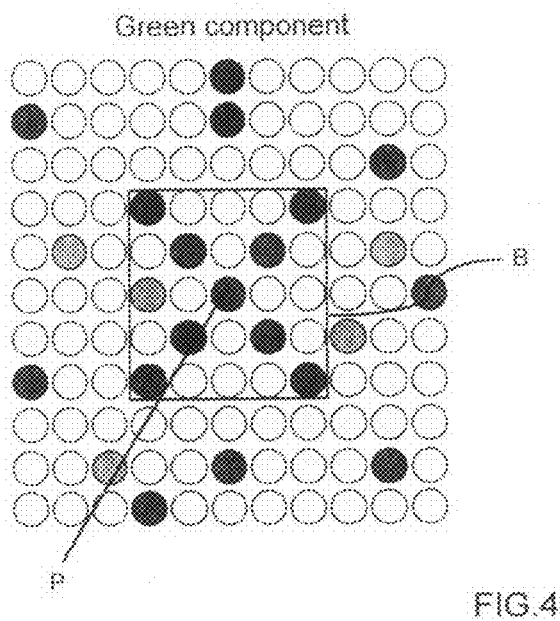
Figure 4:
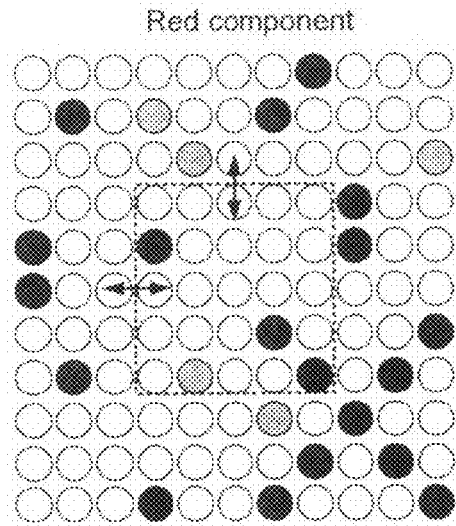
Figure 5:
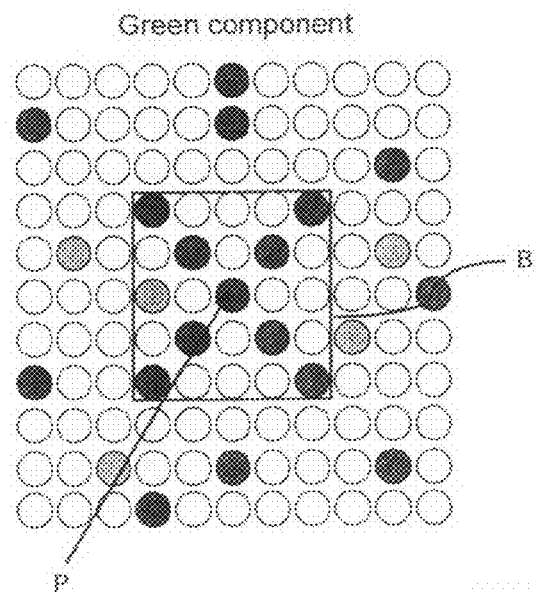
Figure 5:
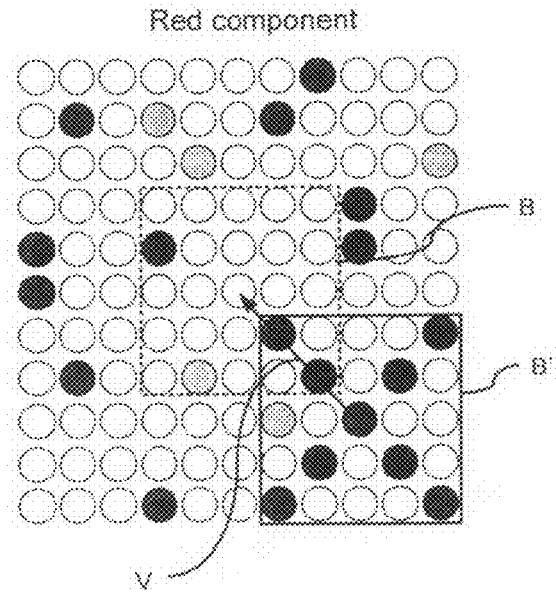

The steps 210 to 250 are illustrated by FIGS. 3 to 5. In these figures, the first color component is a green component and the second color component is a red component. In this example, the first block is centered on the current pixel but it is not mandatory.

The step 210 is to define an analyzing area A around the pixel P to be corrected. The size of said analyzing area is depending on the maximum aberration between two color components. This step is illustrated by the FIG. 3. The left part of the FIG. 3 shows pixels of a green component and the right part shows pixels of a red component. More specifically, this figure shows an analyzing area A centered on a pixel P to be corrected for these two color components. Each pixel has a green component data (shown in the left part of the figure) and a red component data (shown in the right part). In this example, the analyzing area comprises 11×11 pixels.

In a next step 220 illustrated by FIG. 4, a block of pixels B is defined in this analyzing area A and compared to blocks of pixels B' of the red image within the analyzing area by a correlation function. The blocks B' have the same shape and same size than the block B.

For example, a correlation coefficient r is calculated according to the formula of Bravais-Pearson:

$$r = \frac{\sum_{i=1}^{n}(x_i - \bar{x}) \cdot (y_i - \bar{y})}{\sqrt{\sum_{n=1}^{n}(x_i - \bar{x})^2} \cdot \sqrt{\sum_{n=1}^{n}(y_i - \bar{y})^2}}$$

In this formula:
r designates the correlation coefficient with 0<=|r|<=1, the higher r the higher the correlation is.
n designates the amount of pixel within a block B or B';
$x_i$ designates the pixel value of one pixel of the block B;
$y_i$ designates the pixel value of one pixel of the block B';
$\bar{x}$ designates the arithmetic mean of the pixel values of the block B:

$$\bar{x} = \frac{1}{n} \cdot \sum_{i=1}^{n} x_i;$$

and
$\bar{x}$ designates the arithmetic mean of the pixel values of the block B'

$$\bar{y} = \frac{1}{n} \cdot \sum_{i=1}^{n} y_i$$

In the next step 230 illustrated by FIG. 5, the block of pixels B' of the red image having the highest correlation coefficient with the block B is selected. In the example of FIGS. 3-5, the block of pixels B' having the highest correlation with the block B is shifted by 3 pixels horizontally and 3 pixels vertically compared to the block of pixels P. In the next step 240, a shift vector V representative of the shift between the block B' having the highest correlation with the block B is determined (3 pixels horizontally and 3 pixels vertically).

The final step 250 of the chromatic aberration correction method is to shift the red component data of the central pixel of the selected second block in accordance with the shift vector V.

These steps 210 to 250 are applied to all the pixels of the image to be corrected.

The size of the analyzing area A is depending on the maximum aberration between two color channels and the size of the block of pixels B. In the example given here, if the maximum aberration is 3 pixels in the horizontal direction and 3 pixels in the vertical direction and if the size of the block of pixels P is 5×5 pixels, then the size of the analyzing area is preferably 11×11 pixels as illustrated by FIGS. 3 to 5.

The invention can be implemented in an image pick-up or capturing device or any image processing unit like a computer.

Figure 6:
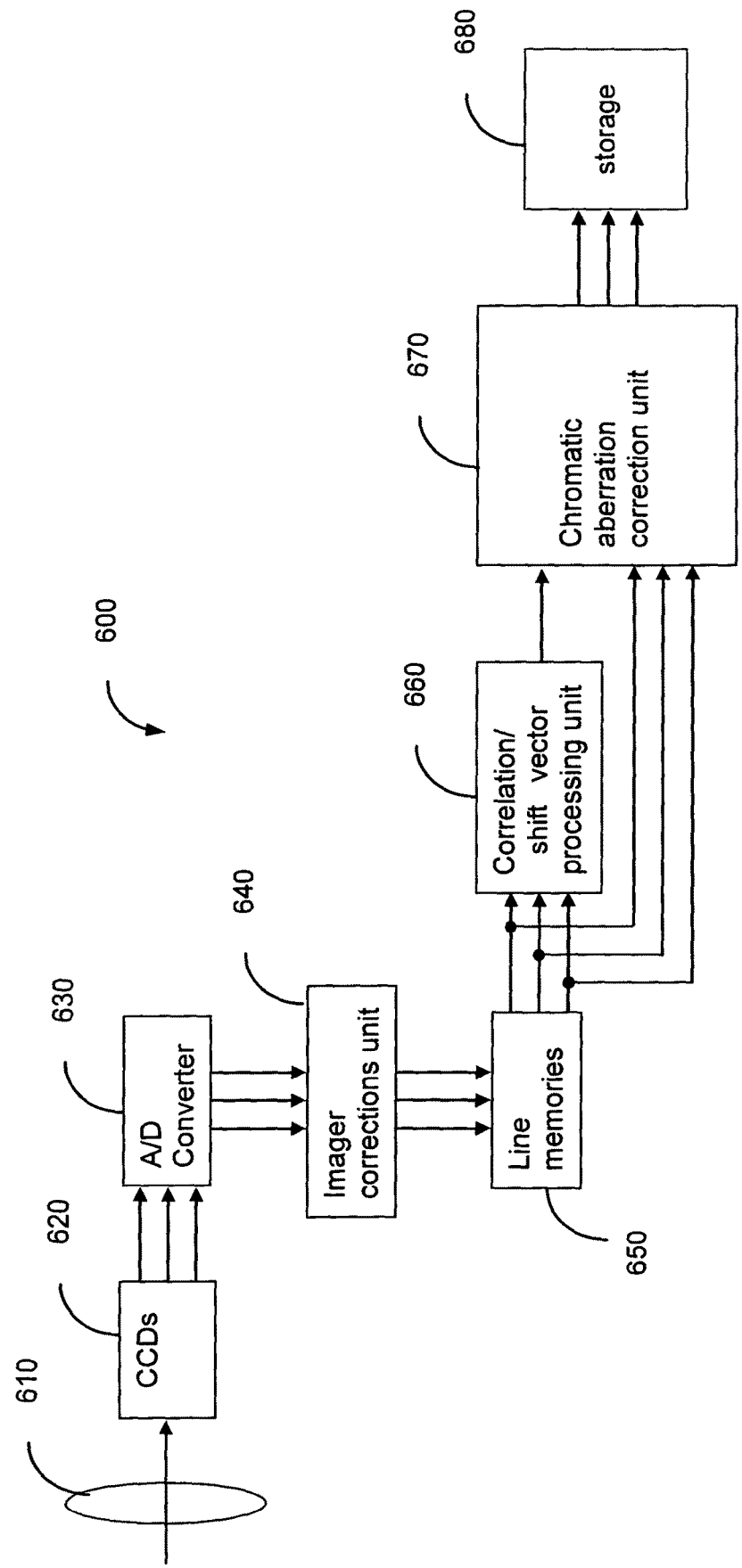
FIG. 6 shows an image pick-up device comprising means for implementing the steps of FIG. 2

FIG. 6 illustrates an image capturing device or image pick-up device 600 implementing the method as described before.

The image pick-up device 600 comprises lenses 610 for focusing light on solid-state image sensors or Charge-Coupled devices (620) for producing analog color channels or components RGB. An analog/Digital converter 630 converts the analog signal of the three RGB channels into digital values. Then an imager corrections unit 640 corrects side effects like noise within the digital domain. The corrected digital values are then stored in line memories 650. The amount of line memories is depending on the number of lines of pixels in the analyzing area. A correlation/shift vector processing unit 660 is then used to calculate the correlation coefficient and the corresponding shift vector V as described before. The shift vector is then used by a chromatic aberration correction unit 670 to correct the image as defined in the method of FIG. 2. The resulting image is stored in a storage unit 680.

The invention is not restricted to the disclosed embodiments. Various modifications are possible and are considered to fall within the scope of the claims. Other shapes or sizes of blocks of pixels can be used. For example, a block of n consecutive pixels belonging to a same row of pixels can also be used. Furthermore, the block B is not necessarily centered on the pixel to be corrected.

The invention claimed is:

1. Method for correcting chromatic aberration between first and second color component data of a current pixel of an image, comprising:
    determining, in the image, an analyzing area around the current pixel,
    comparing, for the current pixel, a first color component data of a first two dimensional block of m×n pixels comprising the current pixel to a second color component data of pixels of second two dimensional blocks of pixels having the same size as the first two dimensional block of m×n pixels within the analyzing area, wherein m and n are both more than 1,
    selecting the second two dimensional block of pixels having the highest correlation with the first two dimensional block of m×n pixels, determining the shift vector to be applied to the selected second two dimensional block in order that said selected second two dimensional block coincides spatially with said first two dimensional block of m×n pixels, and
    shifting the second color component data of the pixel of the selected second two dimensional block corresponding to the current pixel in accordance with the shift vector so as to correct chromatic aberration.

2. Method according to claim 1, wherein the first block of pixels is centered on the current pixel.

3. Method according to claim 1, wherein the size of the analyzing area depends on the size of the first block of pixels and the maximum aberration between the first and second color component data.

* * * * *